No. 762,910. PATENTED JUNE 21, 1904.
H. JUNKERS.
HOT WATER GENERATOR.
APPLICATION FILED APR. 1, 1902.
NO MODEL.
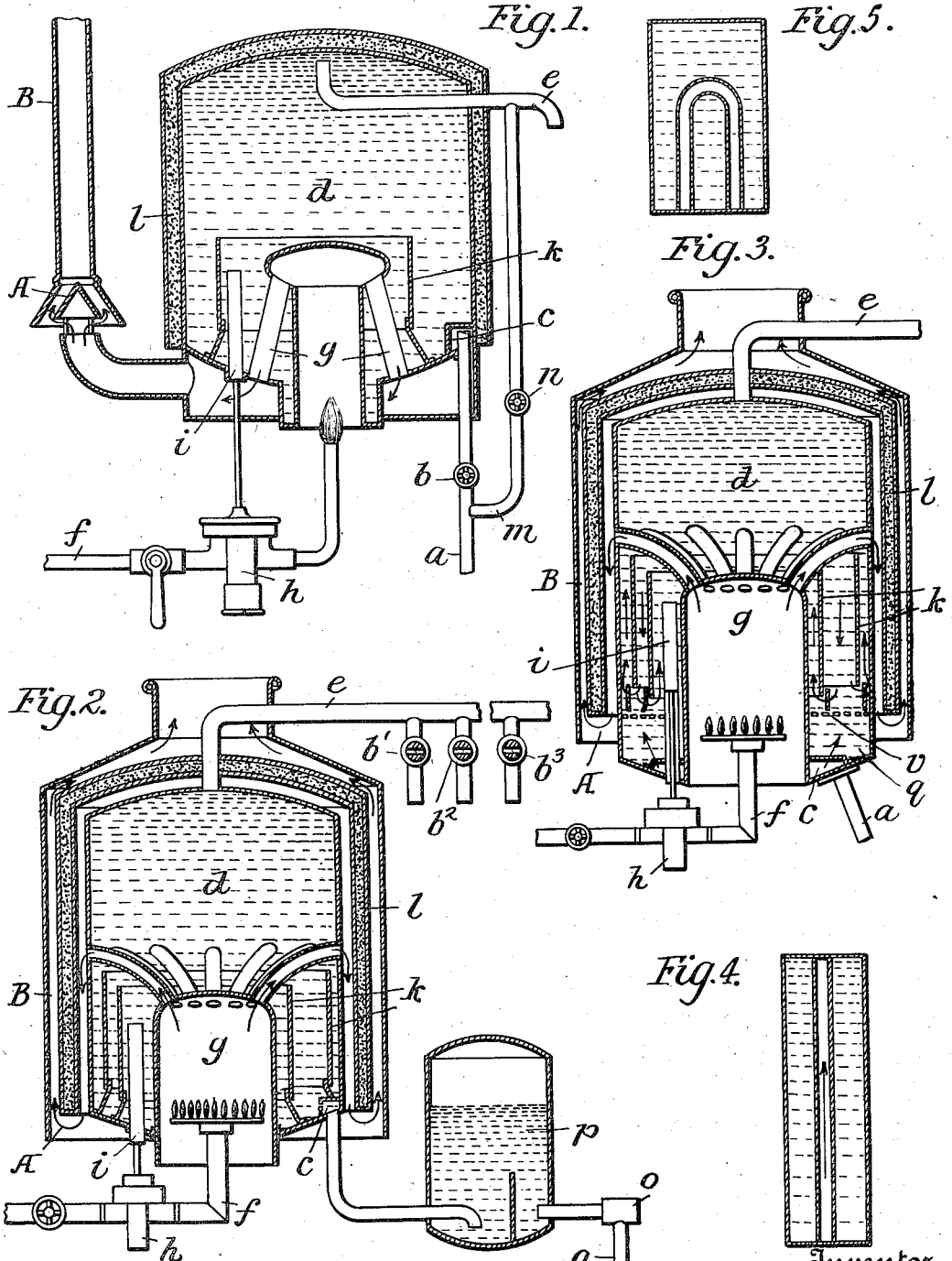

No. 762,910.

Patented June 21, 1904.

UNITED STATES PATENT OFFICE.

HUGO JUNKERS, OF AACHEN, GERMANY.

HOT-WATER GENERATOR.

SPECIFICATION forming part of Letters Patent No. 762,910, dated June 21, 1904.

Application filed April 1, 1902. Serial No. 101,005. (No model.)

*To all whom it may concern:*

Be it known that I, HUGO JUNKERS, a subject of the German Emperor, residing at 52 Boxgraven, Aachen, Germany, have invented certain new and useful Improvements in Hot-Water Generators, of which the following is a specification.

This invention relates to hot-water generators to which the supply of heat is practically continuous but controlled by the temperature of the water in the reservoir.

In carrying out my invention I provide a water-reservoir, with means for keeping it constantly full of water and means for drawing off hot water, a heater extending through the bottom of the reservoir into the water, a fuel-supply pipe for the heater provided with a valve, a device influenced by the temperature of the water for controlling the valve, a circulation-casing surrounding the heater within the reservoir, a space being left between them, and the valve-controlling device being located in said space and remote from the cold-water inlet, and means for taking care of the water of expansion.

In the following specification I have described a preferred embodiment of my invention; but it is to be understood that I do not limit myself to the precise details of construction described.

In the accompanying drawings various constructional forms of my apparatus are shown by way of example.

In the drawings, Figures 1, 2, and 3 are diagrammatic vertical central sections illustrating various forms of my improved apparatus. Figs. 4 and 5 are diagrams for illustrating the principle involved in the arrangement of flues or smoke-passages in my improved apparatus.

The various forms of apparatus can be divided into two classes, according to the pressure therein, viz:

1. Those working at a low pressure which does not substantially exceed the atmospheric pressure, Fig. 1, and in which the valve $b$, controlling the drawing off of the water, is interposed between the water-supply pipe and the apparatus.

2. Those working at a high pressure which is equal to the pressure in the water-supply pipe, Figs. 2 and 3, and in which the valve controlling the drawing off of the water is arranged on the delivery side of the apparatus, so that the pressure of the water-supply acts in the interior of the water reservoir or receptacle.

*1. Apparatus for low pressure.*—Fig. 1 shows an example of a liquid-heater of this kind heated by gas. The cold water from the cold-water-supply pipe $a$, which is provided with a shut-off cock $b$, passes through the water-distributer $c$ into the water receptacle or reservoir $d$, and when water is drawn off—that is to say, on opening the cock $b$—the hot water flows out of this receptacle through the delivery-pipe $e$. The hot water is arranged to run out at the top of the receptacle in order that, if required, the whole reserve of water can be drawn off hot and unmixed with cold water, since the cold water, entering at the bottom of the said receptacle at $c$ by reason of its higher specific gravity, lies at the bottom of the said receptacle and forces out a corresponding quantity of hot water through the pipe $e$ at the top. There is, therefore, only a slight internal pressure above the atmospheric in the receptacle $d$, which pressure when water is being drawn off is equal to the resistance to the motion of the water in the delivery-pipe $e$. The gas is supplied through the pipe $f$ and burns in the heater or fire-box $g$. On its way to the burner the said gas passes through the valve $h$ of the temperature-regulator, which is so adjusted that only the amount of gas required at the time being for the production and maintenance of a definite temperature of the water flows through it. The cap $i$, which is the thermally-sensitive part of the temperature-regulator, is directly exposed to the temperature of the water in the lower part of the vessel. Thus the action of the temperature-regulator is such that so long as the reserve of water does not have the desired maximum temperature the production of heat takes place at the highest possible rate; but when the maximum temperature is reached the valve $h$ of the regulator is brought into a partly-closed position—that is to say, the rate at which heat is generated is reduced to a degree sufficient to cover the unavoidable losses of heat by radiation and conduction in the maintenance of the maximum temperature.

Around the whole heater $g$ on the inside of the receptacle $d$ is arranged a circulation-casing $k$, which, as will be hereinafter described, acts in combination with the heater $g$ and temperature-regulating cap $i$ to properly regulate the heating of the water.

The water receptacle or reservoir $d$ is surrounded by a heat-insulating casing $l$ in order to keep the losses by cooling of the reserve of hot water as low as possible.

The hot gaseous products of combustion rise in the first place in the central passage of the heater and are then effectively cooled in the downwardly-directed pipes thereof—that is to say, give up their heat to the water—after which they pass out through the eduction-flange, which is arranged at one side. The pipe B forms a conduit for carrying off the gaseous products of combustion to the chimney when it is not desired to allow the said gases to pass into the surrounding air.

The object of the interruption in the draft at the point A will be hereinafter explained.

2. *Apparatus for high pressure,* (*pressure of water-supply.*)—Examples of the second class of apparatus are shown in Figs. 2 and 3. The water-supply pipe $a$ in Fig. 2 is connected to the water-receptacle $d$ without the intervention of a shut-off cock or the like. The draw-off valve is arranged beyond the receptacle $d$. The latter is consequently subjected to the pressure of the supply, which may amount to ten atmospheres and over. This arrangement, therefore, requires to be of a form suitable for resisting internal pressure. It, however, offers the great advantage that a number of draw-off pipes $b'$ $b^2$ $b^3$ can be connected thereto, as shown, for example, in Figs. 2 and 3. In this manner, for example, a whole house can be provided with a centralized automatically-operating hot-water supply.

In order to draw off hot water, one of the draw-off valves $b'$, $b^2$, or $b^3$ must be opened. By reason of the pressure in the water-supply pipe $a$ and in the water-receptacle $d$ cold water then flows through the pipe $a$, a vessel $p$, (to be hereinafter described,) and the distributer $c$ into the bottom of the water-receptacle $d$, while a corresponding amount of hot water is forced out through the draw-off pipe $e$.

In order to obtain proper regulation, the temperature-regulating cap $i$ is arranged at the bottom of the apparatus in combination with a circulation-casing $k$. If the circulation-casing were omitted, the following action would take place: The cold water enters the vessel $d$ at the bottom in order that the reserve of hot water shall not be cooled thereby. The cold water has therefore, by reason of its greater specific gravity, a tendency to remain at the bottom of the vessel. If now only small quantities of cold water enter at the bottom, these produce the "full-on" position of the flame, and since in order to heat this water only the lower part of the heating-surface can be used the upper part of the heating-surface, where there is the most active transfer of heat, would meanwhile cause an undesirable overheating of the reserve of hot water. If attempts be made to obviate this disadvantage by moving the regulating-cap to the highest part of the heating-surface, the object would certainly be attained of preventing overheating of the water; but another disadvantage would be substituted therefor—namely, that the temperature-regulator would only come into operation when so much cold water was admitted as to completely or nearly completely cover the heating-surface. Thus a cold-water pocket would be likely to form below the temperature-regulator.

The disadvantages of the two above arrangements are obviated if the heating-surface is surrounded by a casing which is open at the top and bottom, the so-called "circulation-casing" $k$. The water between the heating-surface and the circulation-casing is always being heated, which causes this water to circulate continuously upward, while outside the circulation-casing the water at a lower temperature flows downward. On the entrance of cold water this water is drawn by the natural circulation between the heating-surface and the circulation-casing and carried along the heating-surface, and thus the heating-surface is utilized as completely as possible for heating the cold water. At the same time the reduction of temperature of the circulation-current caused by the cold water is transmitted to the temperature-regulating cap, which is exposed to this current, and thus produces an increased rate of generation of the heat, which continues until the desired temperature of the reserve of water is reached.

The provision of two circulation-casings may be advantageous in cases where the heating-surface surrounds the apparatus both internally and externally, Figs. 2 and 3. In this case the return-current formed by the water rising between each casing and the corresponding heating-surface takes place from the space between the two casings.

The cold water which flows into the apparatus when hot water is drawn off increases in volume during heating. Hereinafter this water will be termed "water of expansion."

Since the capacity of the vessel remains constant, a quantity of water corresponding to this increase of volume must flow out. With a rise of temperature of from 4° to 100° centigrade the water of expansion amounts to about four per cent.

In the low-pressure apparatus the water of expansion runs off through the pipe $e$. In the high-pressure apparatus the water of expansion passes back into the water-supply pipe. Should this not be allowable, it can be kept away by suitable means. A simple arrangement of this kind consists, for example, of a chamber arranged in front of or within the apparatus. Thus a chamber $q$ may be advantageously mounted in the interior of the apparatus itself, Fig. 3. Here, when drawing off hot water, the cold water first enters through the distributer $c$ into the chamber $q$ and from this into the hot-water space proper through the separating-wall $r$, which consists, for example, of a piece of sheet metal provided with holes. The motion and mixture of the water set up by the action of the heater, in combination with the circulation-casings, does not extend to the water in the chamber $q$. In the latter chamber the water retains approximately the temperature of the supply-pipe. The water of expansion formed during the heating of the reservoir $d$ now passes gradually through the perforated wall $r$ into the chamber $q$ and forces a corresponding quantity of cold water back through the water-distributer into the supply-pipe $a$.

With a gentle entrance and uniform stratification of the cold water in the bottom of the apparatus itself, independently of the wall $r$, and by a correspondingly high arrangement of the circulation-casing and of the temperature-regulating cap only is it possible for cold water to which the action of the circulation-casing does not extend to remain at the bottom of the apparatus, and which cold water during the heating and expansion of the water above is forced back into the supply-pipe.

Another device for rendering the water of expansion innocuous is shown in Fig. 2, where an air-chamber $p$ is interposed in the water-supply pipe, and the latter is provided with a check-valve $o$ near the entrance to the chamber. In this case the pressure of the water-supply will compress the air in the chamber $p$, so that a body of air will be above the water in the chamber. The water of expansion will, however, still further compress the air within the chamber and the check-valve $o$ will prevent any of the water being forced back from the chamber into the supply-pipe $a$.

In order to keep the consumption of fuel as low as possible during the possibly very long periods during which the flame is in its lowered position, and thus render the apparatus economical in use, the eduction-passage for the products of combustion is arranged at the bottom of the apparatus. Should the gaseous products of combustion not pass into the surrounding air, but into an eduction-passage B, which can be arranged at the side of the apparatus, Fig. 1, or concentrically around the said apparatus, Figs. 2 and 3, an interruption can be made at A in the eduction-piping. The object of this interruption in the eduction-piping is not that of the known draft-openings in gas heating apparatus and stoves, which are designed to obviate derangements in the combustion process and in the efficient utilization of the heating agent caused by the external effects of variations in the static and dynamic conditions of the atmospheric pressure—for example, too strong or insufficient draft in the chimney, back draft, or stoppage of the escaping gases; but in my improved apparatus the opening A serves to prevent loss of heat from internal effects—namely, from the fact that the reserve of hot water itself tends to generate an air-draft which would carry away heat. The explanation of this circumstance may be given as follows: Consider two vessels, such as are shown in Figs. 4 and 5, filled with hot water. In the tube of the one shown in Fig. 4 a strong draft will be produced by the heating of the air by the water, which draft removes heat from the water, while in the case illustrated in Fig. 5 the air is certainly heated in the two limbs; but it remains stationary, so that losses of heat by air-draft are precluded. Quite similar conditions prevail in the apparatus forming the subject of my said invention when the flame is in the lowered condition.

If the eduction-pipe for the gaseous products of combustion be turned straight upward, as in Fig. 4, there would result a strong cooling-draft, and consequently cooling of the reserve of hot water and the full-on position of the burner, and thus also increased consumption of gas. In the arrangement shown in Figs. 1, 2, and 3, on the other hand, when the burner is in its turned-down position there is only a very slight draft in the heater, since the upwardly and downwardly extending limbs of the eduction-pipe act oppositely to each other in producing the draft.

If the gases are not to pass into the surrounding air at the bottom, but are to be conducted farther upward—into a chimney, for example—it is a necessary condition in order to maintain this slight draft in the heater when the burner is in its turned-down position that an interruption of the draft be arranged at the point A in the piping for carrying off the gaseous products of combustion. This can be, for example, a simple interruption in the eduction-pipe, Fig. 1, or an annular opening at A, Figs. 2 and 3.

In the case where the eduction-passage B, as shown in Figs. 2 and 3, is arranged concentrically around the reservoir $d$ the application of a heat-retaining casing $l$ is very advantageous in order to prevent the cooling of the outer surface of the water-reservoir by the eduction-passage B.

My improved apparatus also presents the further advantages that ignition or lighting up is not required when it is required to draw off water, and therefore explosions are entirely prevented. Moreover, the manipulation is extremely simple, since it is only necessary to open and close one or two water-valves. Burning through inattention is impossible, since the apparatus is always filled with water.

There is no danger of freezing on account of the continually-burning flame. Without any preparations boiling water or water of any desired or predetermined temperature is available immediately. I obtain, moreover, economical utilization of the gaseous products of combustion with the minimum loss by radiation and conduction. This point is especially important on account of the continuous generation of heat at the lowered position, since without the most careful reduction of the consumption of gas to a minimum apparatus of this kind would be useless from an economical point of view. Thus there are no losses of heat by evaporation, and consequently there is no unnecessary consumption of fuel, and smaller eduction-pipes are employed than in the water-current apparatus of the same duty, since the production of heat extends over a very much longer time, and, lastly, by reason of the continuous generation of heat the formation of the gaseous products of combustion is also distributed over a longer time, and thus the disadvantages of the apparatus heretofore constructed, which for the same thermal duty involve the formation of the same total amount of gaseous products of combustion in a shorter time, are correspondingly reduced.

Having now particularly described and ascertained the nature of my said invention and in what manner the same is to be performed, I declare that what I claim is—

1. The combination with a water-reservoir, of a heater extending through the bottom of the reservoir into the water, a fuel-supply pipe for said heater, a valve in said pipe, a circulation-casing surrounding the heater with a space between them a device connected to the valve and extending into the said space, said device being influenced by the temperature of the water to control the valve, and means for delivering cold water into the lower end of the reservoir at a point remote from said circulation-space, substantially as set forth.

2. The combination with a water-reservoir and a cold-water-supply pipe entering the bottom of the reservoir, of means for heating the water in the reservoir, and a chamber between the reservoir and the source of water-supply into which water is forced from the reservoir by the expansion of the heated water, substantially as set forth.

3. The combination with a water-reservoir and a cold-water-supply pipe therefor, of means for heating the water in the reservoir, an air-chamber interposed in the supply-pipe through which the water flows to the reservoir and a check-valve in the supply-pipe for preventing water from being forced back from the air-chamber by the expansion of the heated water in the tank, substantially as set forth.

In witness whereof I have hereunto set my hand in presence of two witnesses.

HUGO JUNKERS.

Witnesses:
  JOHN B. ADAMS,
  HENRY QUORDFLIEG.